Sept. 3, 1940.  J. E. RENFER  2,213,823
SHOCK ABSORBING STRUT
Filed Aug. 7, 1939  2 Sheets-Sheet 1
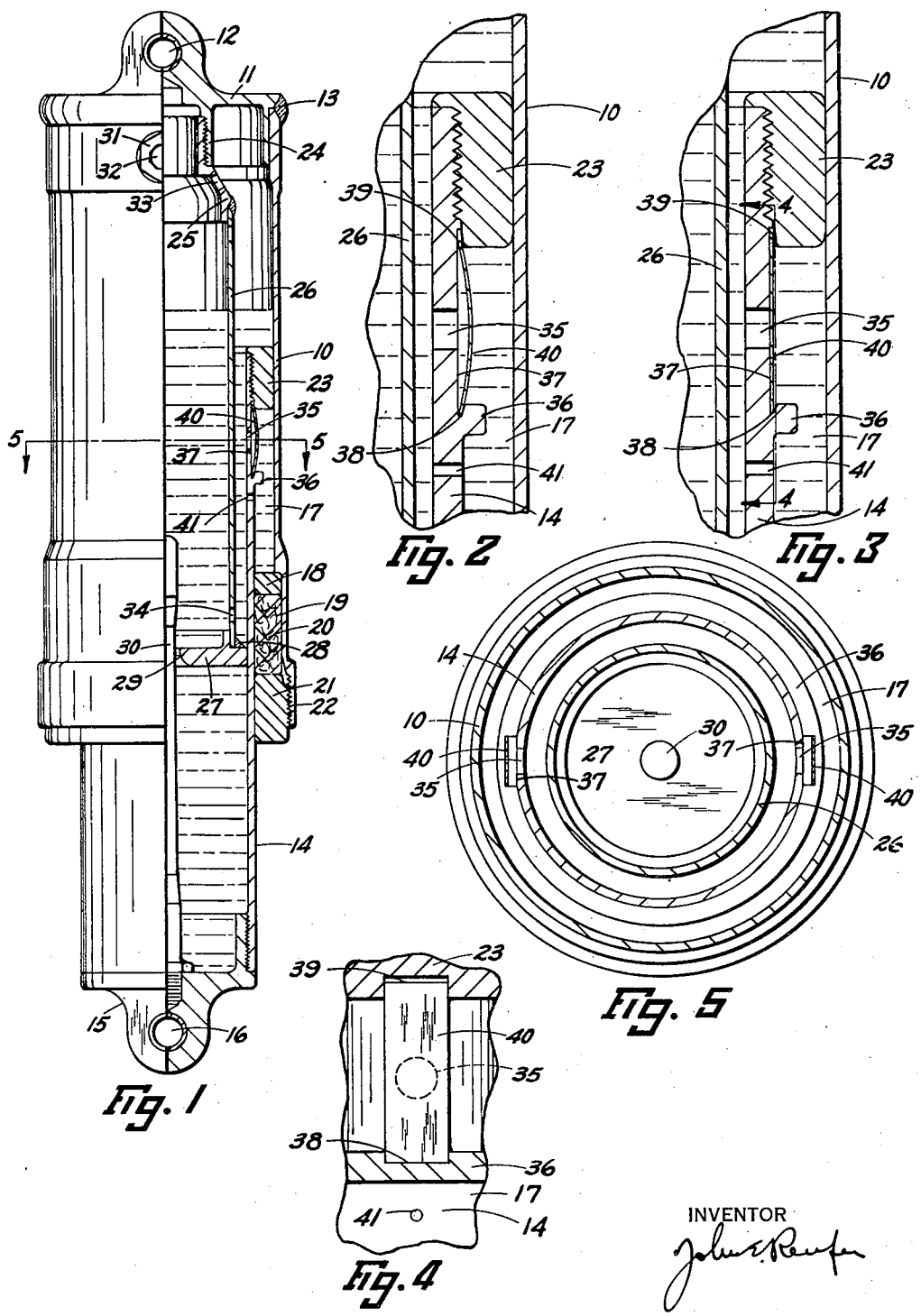
INVENTOR
John E. Renfer Sept. 3, 1940.  J. E. RENFER  2,213,823
SHOCK ABSORBING STRUT
Filed Aug. 7, 1939  2 Sheets-Sheet 2

INVENTOR
John E. Renfer

Patented Sept. 3, 1940

2,213,823

UNITED STATES PATENT OFFICE 2,213,823

SHOCK ABSORBING STRUT

John E. Renfer, Cleveland Heights, Ohio, assignor to The Cleveland Pneumatic Tool Company, Cleveland, Ohio, a corporation of Ohio Application August 7, 1939, Serial No. 288,787

7 Claims. (Cl. 267—64)

This invention relates broadly to improvements in shock absorbers, but more particularly to shock absorbing struts for use primarily in landing gears of aircraft.

One object of this invention is the provision of a novel and efficient valve construction between the two chambers of the strut for automatically controlling the transfer of the liquid therebetween.

Another object of this invention is to provide such shock absorbing struts with a valve mechanism responsive to pressure conditions within the strut for enabling a freer transfer of the liquid in one direction than in the other.

Another object of this invention is the provision in a shock absorbing strut of a novel valvular mechanism of simple and efficient construction, through which displacement of the liquid in one direction may be controlled for checking the rebounds of the parts whose relative movements are to be cushioned.

Other objects and advantages more or less ancillary to the foregoing reside in the specific construction and aggroupment of the elements peculiar to this structure, as will become apparent from a more complete examination of this specification.

In the drawings:

Fig. 1 is an elevational view partly in longitudinal section of a shock absorbing strut embodying the invention.

Fig. 2 is an enlarged fractional view of the strut illustrating the valve in open position.

Fig. 3 is a view similar to Fig. 2 illustrating the valve in closed position.

Fig. 4 is a longitudinal sectional view taken in a plane indicated by line 4—4 in Fig. 3.

Fig. 5 is an enlarged cross sectional view taken in a plane indicated by line 5—5 in Fig. 1.

Figure 6:
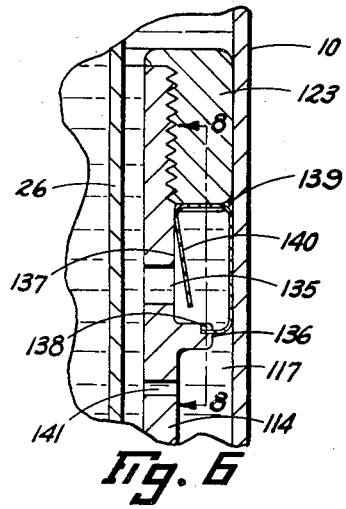
Figs. 6 and 7 are views similar to Fig. 2 illustrating a modification of the invention.

Referring to the drawings, the shock absorbing strut shown includes an upper cylinder 10 closed at its upper end by a cap 11 apertured as at 12 for attachment to the fuselage of the craft. This cap is secured to the cylinder 10 by any suitable means such as a weld 13, while the lower end of the cylinder is open to enable free passage of a lower cylinder 14 telescopically mounted within the cylinder 10. The lower end of the cylinder 14 is closed by a cap 15 which is apertured as at 16 for attachment to the landing wheel or ground engaging member of the craft. The lower cylinder is materially smaller than the upper one to form between them an annular chamber 17 closed at its lower end by a bushing 18 engaging the bottom of a counterbore 19 forming the lower end of the upper cylinder, which bushing forms a sliding bearing between the two cylinders. The counterbore 19 also accommodates packing rings 20 held in position by a gland nut 21 screwed within the threaded portion 22 of the counterbore 19. The upper end of the annular chamber 17 is closed by a piston 23 carried by the inner end of the lower cylinder 14, which piston fits closely within the cylinder 10 and acts as a sliding bearing for the lower cylinder 14.

Internally, the cap 11 closing the upper end of the cylinder 10, is formed with a skirt 24 within which is threaded a connection 25 having welded thereto the upper end of a check tube 26, which tube extends downwardly into the cylinders 10 and 14 in coaxial alignment therewith and has its lower end carrying a piston 27 slidably engaging the inner wall of the cylinder 14, which piston is preferably secured to the tube 26 by a weld 28. The piston 27 is provided with a central orifice 29 through which is free to slide a metering pin 30 carried by the cap 15 of the lower cylinder 14.

Mounted in the wall of the cylinder 10 adjacent the upper end thereof, there is a removable filler plug 31 and an air valve 32 through which liquid and compressed air may be introduced into the strut. To that end, the connection 25 is formed with one or more ports 33 extending therethrough and affording constant communication between the interiors of the cylinder 10 and tube 26. Adjacent the piston 27, the tube 26 is also provided with one or more ports 34, the purpose of which will be explained later.

Extending through the wall of the cylinder 14 below the piston 23, there are two diametrically opposed ports 35 affording communication between the annular chamber 17 and the interior of the cylinder 14. Below the ports 35, the cylinder 14 is provided with an external annular flange 36. Between this flange and the piston 23, the portion of the external wall of the cylinder 14 adjacent each port 35 is machined perfectly flat to form a substantially rectangular valve seat 37 having the port 35 opening in the center thereof. Each seat 37 extends partway into the annular flange 36 to form a rectangular recess 38, and into the piston 23 to form a similar recess 39, within which recesses are mounted the ends of a rectangular diaphragm valve 40.

In practice, each valve is preferably made of a relatively thin spring tempered steel plate bent longitudinally in concaved relation with respect to the valve seat 37, as clearly shown in Fig. 2. This valve is normally somewhat shorter than the distance between the bottom of the recesses 38 and 39, thereby enabling the valve to flex into fluid tight engagement with the seat 37 as clearly shown in Fig. 3. Below the annular flange 36, there is through the cylinder 34 one or more ports 41 which are somewhat smaller than the ports 35.

Figure 7:
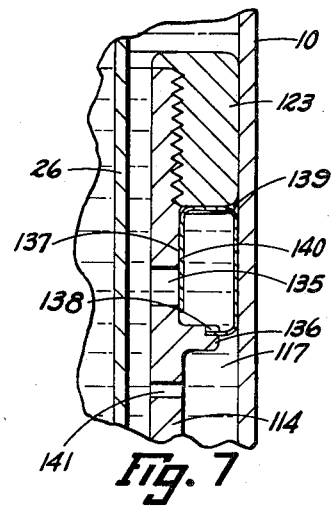
Figure 8:
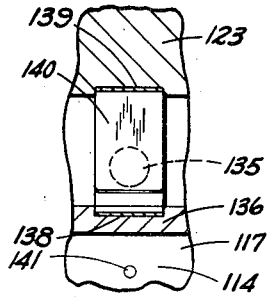
Fig. 8 is a longitudinal sectional view taken in a plane indicated by line 8—8 in Fig. 6.
Figure 9:
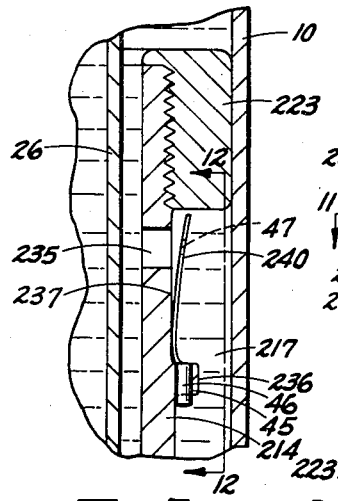
Figs. 9 and 10 are views similar to Fig. 2 illustrating another modification of the invention.

In the modification shown in Figs. 6 to 8 inclusive, the lower cylinder 114 is also provided, between the piston 123 and the annular flange 136, with a substantially rectangular valve seat 137 similar to the seats 37 of the cylinder 14 above referred to. In longitudinal alignment with the seat 137, there is provided in the lower end wall of the piston 123 a radially extending recess 139, and in the upper end wall of the flange 136, a similar recess 138 extending inwardly only part way across the flange. Opening in the center of the seat 137, there is also a port 135 extending through the wall of the cylinder 114. In this modification, the valve 140 is also made of a thin spring temper steel plate but of substantially U-shaped side configuration with the lower and upper ends thereof located within the recesses 138 and 139 respectively, while the outer arm thereof is free to bear slightly against the inner wall of the upper cylinder 10. The inner arm of the valve is bent outwardly relative to the valve seat 137 to normally keep the port 135 open as clearly shown in Fig. 6, but is capable of flexing into fluid tight engagement with the seat 137 to close the port 135 as shown in Fig. 7. Below the flange 136, the cylinder 114 is also provided with one or more ports 141.

Figure 10:
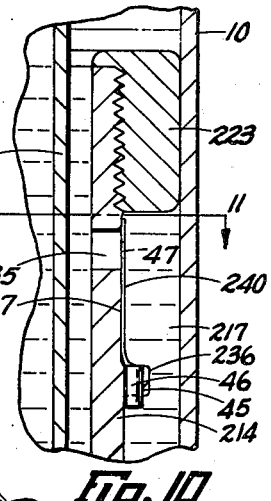
Figure 11:
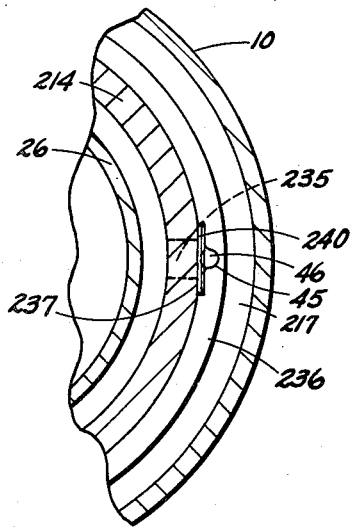
Fig. 11 is a cross sectional view taken in a plane indicated by line 11—11 in Fig. 10.
Figure 12:
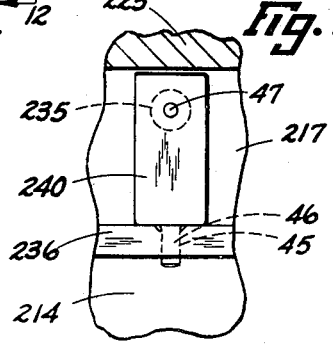
Fig. 12 is a longitudinal sectional view taken in a plane indicated by line 12—12 in Fig. 9.

In the modification shown in Figs. 9 to 12 inclusive, the cylinder 214 is also provided with a valve seat 237 similar to the valve seats 37, and with an annular flange 236 and port 235. In this instance the flange 236 below the port 235 is provided with a longitudinally disposed aperture 45 adapted to receive the cylindrical shank 46 of a substantially rectangular valve 237 also made of a thin spring tempered steel plate and extending between the flange 236 and the piston 223. The valve 237 is bent outwardly relative to the cylinder 214 to remain normally open relative to the port 235, as clearly shown in Fig. 9, but is capable of flexing into fluid tight engagement with the valve seat 237, as shown in Fig. 10. In this construction, the port through the lower cylinder corresponding to the port 41 in Fig. 2, has been replaced by a port 47 extending through the valve 240 and located so as to register with the port 235 when the valve is positioned as shown in Fig. 10.

Preparatory to its operation, the shock absorbing strut is partly filled with liquid, such as oil, introduced in the strut by removing the filler plug 31. After the strut has been installed between the parts of the craft whose relative movements are to be cushioned, compressed air, through the air valve 32, is introduced into the strut until it is partly extended substantially as shown in Fig. 1.

In operation, during compression of the shock absorbing strut, the liquid will flow from below the piston 27 into the tube 26 through the orific 29, which orifice is metered by the metering pin 30 sliding through the orifiice 29. From the tube 26 the liquid will also flow through the ports 34 into the portion of the cylinder 14 extending above the piston 27, and therefrom into the annular chamber 17 through the ports 35 and 41. In this instance, the valves 40 normally spaced from their respective valve seat 37 will be subjected to outward pressure of the liquid, thereby enabling the valves to remain open relative to the ports 35 and consequently enabling free flow of the liquid through the ports 35.

During the compression stroke of the shock absorber, its inward telescopic movement is primarily checked by the action of the compressed air on the liquid and the displacement of the liquid through the metered orifice 29. When the shock absorbing strut is subjected to forces causing its extension, the liquid will flow from the cylinder 10 into the tube 26 via the ports 34 and therefrom into the cylinder 14 below the piston 27 via the orifice 29.

During the extension stroke of the strut, the reduction in the volumetric capacity of the annular chamber 17 resulting from the downward movement of the piston 23, will cause the liquid within that chamber to exert inward pressure on the valves 40, thereby causing the valves to flex into fluid tight engagement with their respective valve seat 37 or into closed position relative to the ports 35. Thereafter, the transfer of the liquid from the chamber 17 into the cylinder 14, will take place only through the ports 41, the combined liquid conveying capacity of which is calculated to afford an efficient check of the extension or recoil strokes of the strut.

During the next compression stroke of the strut, the pressure in the chamber 17, being relieved due to the upward movement of the piston 23, will enable the valves 40 to flex again into their normal open position relative the ports 35 for enabling free transfer of the liquid from the cylinder 14 into the annular chamber 17.

In the modification of the invention shown in Figs. 6 to 8 inclusive, during the compression stroke of the strut, the ports 135 are normally open by the valves 140, enabling free displacement of the fluid from the cylinder 114 into the annular chamber 117. During the extension of the shock absorbing strut, the liquid within the annular chamber 117 will exert inward pressure on the innermost arms of the valves 140 to cause their flexing into fluid tight engagement with the valve seats 137 for closing the ports 135, thereby retarding the displacement of the liquid from the chamber 117 through the ports 141.

In the modification of the invention shown in Figs. 9 to 12 inclusive, during the compression stroke of the strut the ports 235 are normally open by the valves 240, thereby enabling full displacement of liquid into the annular chamber 217. Upon extension of the strut, the liquid within the chamber 217 will exert inward pressure on the valves 240 for causing them to flex into closed position relative to the ports 235, thereby retarding the transfer of the fluid from the chamber 217 through the ports 47 of the valves 240, which ports are now in direct communication with the ports 235.

From the foregoing description, it will be understood that the present valve construction is particularly adapted for use with shock absorbing struts of relatively large diameter wherein each port corresponding to the port 35 in Fig. 2 may be controlled by an individual valve, thereby overcoming the use of relatively large annular or sleeve-like valve surrounding the entire lower cylinder.

While I have illustrated in Fig. 5 the use of two diametrically opposed valves, it will be understood that the number of valves may be reduced or increased without departing from the scope of this invention, and that the shape and configuration of the valves may also be changed at will without in any way departing from the scope and spirit of the appended claims.

I claim:

1. A shock absorbing strut comprising a pair of telescoping cylinders of different cross-sectional areas having liquid stored therein, a port through the wall of the smaller cylinder, a valve seat on the external side surface of said cylinder surrounding said port, and a valve made of thin metal capable of flexing into or out of engagement with said seat for enabling a freer flow of the liquid through said port in one direction than in the other.

2. A shock absorbing strut comprising a pair of telescoping cylinders of different cross-sectional areas having liquid stored therein, an annular chamber between said cylinders, means enabling freer transfer of the liquid from the smaller cylinder into said chamber than in the reverse direction including a port through the side wall of said cylinder, a valve seat on the external side surface of said cylinder surrounding said port, and a valve carried by said cylinder made of thin metal capable of flexing into or out of engagement with said seat.

3. A shock absorbing strut comprising a pair of telescoping cylinders of different cross-sectional areas having liquid stored therein, an annular chamber between said cylinders, means enabling freer transfer of the liquid from the smaller cylinder into said chamber than in the reverse direction including a port radially through said cylinder, and a valve carried by said cylinder radially movable into or out of engagement with the portion of the external surface of said cylinder surrounding said port.

4. A shock absorbing strut comprising a pair of telescoping cylinders of different cross-sectional areas having liquid stored therein, an annular chamber between said cylinders, means enabling freer transfer of the liquid from the smaller cylinder into said chamber than in the reverse direction including a port radially through said cylinder, a flat seat on the external surface of said cylinder surrounding said port, and a valve between said seat and the inner wall of the largest cylinder radially movable into or out of engagement with said seat.

5. A shock absorbing strut comprising a pair of telescoping cylinders of different cross-sectional areas having liquid stored therein, an annular chamber between said cylinders, means enabling freer transfer of the liquid from the smaller cylinder into said chamber than in the reverse direction including a plurality of ports extending through the wall of said cylinder, and an individual valve for each of said ports carried by said cylinder, said valves being subjected to pressure conditions within said chamber for controlling said ports.

6. A shock absorbing strut comprising a pair of telescoping cylinders, chambers within said cylinders having liquid stored therein, means enabling freer transfer of the liquid between said chambers during telescopic movement of said cylinders in one direction than in the other including a port through the side wall of one of said cylinders, and a diaphragm valve carried by said cylinder responsive to pressure conditions in one of said chambers for controlling said port.

7. A shock absorbing strut comprising a pair of telescoping cylinders, a chamber internally and externally of the smaller cylinder having fluid stored therein, and means enabling a freer flow of the fluid between said chambers in one direction than in the other including a port extending through the side wall of said cylinder, and a valve carried by said cylinder movable toward and away from said wall by virtue of pressure conditions within one of said chambers for controlling said port.

JOHN E. RENFER.